(12) United States Patent
Koops et al.

(10) Patent No.: US 6,444,068 B1
(45) Date of Patent: Sep. 3, 2002

(54) USE OF A LASER-SENSITIVE COATING FOR THE PRODUCTION OF A LASER-INSCRIBABLE SHEET OF GLASS

(75) Inventors: Arne Koops; Ronald Pfaff; Christian Kreft, all of Hamburg (DE)

(73) Assignee: tesa AG, Hamburg (DE)

( * ) Notice: Subject to any disclaimer, the term of this patent is extended or adjusted under 35 U.S.C. 154(b) by 0 days.

(21) Appl. No.: 09/299,170

(22) Filed: Apr. 26, 1999

(30) Foreign Application Priority Data

May 30, 1998 (DE) .......................... 198 24 349

(51) Int. Cl.$^7$ ............................... B32B 17/10
(52) U.S. Cl. .................. 156/99; 156/100; 156/272.8; 427/514; 427/554; 430/363
(58) Field of Search .................. 156/99, 100, 272.2, 156/272.8, 278; 65/60.1, 30.1; 427/487, 508, 514, 553, 554; 430/363, 365, 945

(56) References Cited

U.S. PATENT DOCUMENTS 5,030,551 A * 7/1991 Herren et al. ............... 430/495
5,576,377 A * 11/1996 El Sayed et al. ............ 524/495
5,626,966 A * 5/1997 Kulper et al. ............ 428/423.1

FOREIGN PATENT DOCUMENTS

| CA | 1284125 | * | 5/1991 |
| FR | 2495982 | * | 6/1982 |
| WO | 90/01418 | * | 2/1990 |

* cited by examiner

*Primary Examiner*—Michael W. Ball
*Assistant Examiner*—John T. Haran
(74) *Attorney, Agent, or Firm*—Norris McLaughlin & Marcus

(57) ABSTRACT

Method for the production of a laser-inscribable sheet of glass, wherein a laser-sensitive coating, comprising a) a base polymer and
b) a radiation-sensitive additive which exhibits a color change on laser irradiation, is applied to at least part of a sheet of glass and hardened, and the sheet of glass is subsequently inscribed by means of a laser.

9 Claims, No Drawings

USE OF A LASER-SENSITIVE COATING FOR THE PRODUCTION OF A LASER-INSCRIBABLE SHEET OF GLASS

BACKGROUND OF THE INVENTION

The invention relates to the use of a laser-sensitive coating for the production of a laser-inscribable sheet of glass.

In the identification and labeling of products, control of manufacturing processes and for quality control, readable information is frequently applied to a component, including to glasses.

Hitherto, glasses, which can have a single-layer or multilayer structure, have been marked using labels, mechanical engraving or chemical etching methods. Labels are unsuitable for durable markings, and the two latter markings are frequently not used owing to the complex process.

SUMMARY OF THE INVENTION

The invention is based on the object of providing a laser-inscribable sheet of glass which is simple to manufacture, has high counterfeiting security and generally avoids or at least reduces the disadvantages of the prior art.

This object is achieved by using a laser-sensitive coating comprising
a) a base polymer and
b) a radiation-sensitive additive which exhibits a color change on laser irradiation.

The invention furthermore relates to a process for the production of a laser-inscribable multilayer glass.

Accordingly, the invention proposes the use of a laser-sensitive coating for the production of a laser-inscribable sheet of glass, where the laser-sensitive coating comprises a base polymer and a radiation-sensitive additive which exhibits a color change on laser irradiation. The coating system can be a colored or transparent coating system which exhibits decolorization on laser irradiation.

DETAILED DESCRIPTION

This laser-sensitive coating is applied to at least part of a sheet of glass and hardened. Suitable application methods are the known techniques, such as pouring and coating. The sheet of glass is subsequently inscribed by means of a laser.

The base polymer is preferably selected from a group consisting of unsaturated polyesters, epoxy, polyester and urethane acrylates, very particularly preferably an aliphatic polyurethane acrylate as also used for UV printing inks or EBC coatings in the furniture industry.

In addition, the base polymer is advantageously mixed with coloring pigments, light stabilizers, heat stabilizers or processing aids. The choice of said additives depends on which properties the laser-sensitive coating is to have.

The base polymer preferably contains the radiation-sensitive additive in a concentration in the range from 0.001% by weight to 3% by weight, based on the high-molecular-weight prepolymer, the radiation-sensitive additive being in particular a colored pigment or a metal salt, such as a copper salt or a titanium compound. Also suitable are white and colored pearlescent pigments based on mica and titanium dioxide or iron(III) oxide. Preference is given to copper hydroxide phosphate or Iriodin®.

The additives are incorporated into the base polymer and are in finely divided form. The incorporation of the radiation-sensitive additive into the base polymer is carried out by known methods, for example by admixing the additive, in the form of a masterbatch, with the high-molecular-weight base polymer using an extruder, roll mill, mixer or grinder.

Preferred laser-sensitive pigments according to the invention are those which exhibit virtually no absorption in the visible wavelength region or, owing to the low concentration, give transparent or clear coating films.

In a particularly advantageous use, the laser-sensitive coating is applied between two sheets of glass and hardened, in which case the coating serves as bonding medium between the glass sheets.

The present invention also covers application of the coating to the outsides of laminated safety glass sheets, as used to obtain dirt-repellent or scratch-resistant sheets.

Another possible use of a laser-inscribable coating is for edge sealing of laminated safety glass sheets, in particular laminated vehicle windows, for example for the top edge of car windows which can be wound down. The base polymer can be applied to glass sheets by any conventional method, for example by scattering a powder or application of sheeting, followed by melting to give a strongly adherent film. It is likewise possible to apply aqueous emulsions.

Finally, the laser-sensitive coating can particularly advantageously be employed in a process for the production of a laser-inscribable multilayer glass, where the process comprises the following steps:
a) two glass sheets are bonded to one another in such a way that a cavity remains between them,
b) the cavity present between the glass sheets is filled with a coating material to such an extent that only a small partial region remains,
c) the laser-sensitive coating is introduced into the partial region,
d) the coating is then subjected to radiation-chemical curing, and
e) the multilayer glass is finally inscribed by means of a laser.

The inscription of the glass layers which are suitable in accordance with the invention is carried out using high-energy sources, such as lasers. Examples of such sources are solid-state lasers, such as neodymium-yttrium-aluminum-garnet lasers (Nd:YAG lasers), which emit at a wavelength of 1.06 $\mu$m. Owing to the ready adjustability of their laser parameters, such as, for example, pulse frequency, lamp current and velocity of the laser beam, lasers can be used for precise matching to the needs of the materials to be inscribed.

In this case, a setting should be selected which means the greatest interaction for the laser-sensitive pigment, but does not give rise to expectations of any significant changes for the glass and the hardened coating film.

Incidence of the laser beam causes a color change with pronounced contrast at the irradiated points of the laser-sensitive film.

The process facilitates lifelong labeling of the glass sheet with barcodes, logos and with clear text, and in addition a marking which, in the case of multilayer glasses, is within the glass and consequently is extremely abrasion- and scratch-resistant. A labeling thus has equally high resistance as the glass itself.

The inscription is corrosion-resistant, dimensionally stable, deformation-free, and light-, heat- and weather-resistant. The novel coating material allows good legibility, high resolution and extremely small inscription sizes to be achieved.

In addition, the mechanical and physical properties of the glass are not, as in conventional processes, impaired by engraving or chemical etching. This should be particularly emphasized in the labeling of sensitive glasses, as used in windows in safety areas or in vehicles as windshields.

The simple and secure inscription of glass sheets, which can also take place, for example, on or in the glass sheet after installation in the vehicle and carries, for example, the vehicle number, can be used as an additional safeguard against theft.

However, the marking of the glasses with a brand is also readily possible, for example in the case of spectacle lenses.

In the laser-sensitive coating material according to the invention, the color change takes place through a direct color change of the additive itself or of the immediately adjacent vicinity through decomposition processes (carbonization) of the surrounding plastic matrix. The latter occurs in the particularly advantageous use of copper hydroxide phosphate. Foaming of the base polymer does not occur since only very few cracking gases, or none at all, are produced.

It is thus ensured that only very low emissions of cracking products, or none at all, occur during the inscription process. Such cracking products can result, inter alia, in breaking of the bond in a multilayer glass sheet if care is not taken to divert such products beforehand.

The invention is described in greater detail below by means of examples, but is not restricted thereto.

EXAMPLE 1

In accordance with German Utility Model 81 30 861, the radiation-curing coating is prepared from 90% by weight of a commercially available polyurethane acrylate and 10% by weight of HDDA. 0.1% by weight of copper hydroxide phosphate and 0.5% by weight of the photoinitiator Irgacure 184 are incorporated by vigorous stirring.

This transparent coating material is introduced into the cavity between the two glass plates by a special pouring method and hardened by ultraviolet (UV) radiation.

The resultant bond between coating film and glass can then be inscribed with a tesa Label Laser® inscription laser having a wavelength of 1.06 μm through the upper glass layers. High-contrast inscriptions with sharp contours which have no further effect on the bond are formed. Laser inscription can be used to produce barcodes which can be read automatically.

EXAMPLE 2

Analogously to Example 1, the laser-sensitive additive copper hydroxide phosphate is replaced by a dye which produces decolorization in the regions of the laser beam treatment. This allows the production of decorative glass treatments in the area of house, furniture-door and automobile glass. It is also possible to produce masks for industrial application.

We claim:

1. A method for the production of a laser-inscribable sheet of glass, comprising the steps of:
   a) providing a laser-sensitive coating, comprising
      i) a base polymer and
      ii) a radiation-sensitive additive which exhibits a color change upon laser irradiation;
   b) applying said coating in liquid form to at least part of a sheet of glass;
   c) hardening said coating by radiation-chemical curing; and subsequently
   d) inscribing the coating by means of a laser.

2. Method according to claim 1, wherein the base polymer is selected from the group consisting of unsaturated polyesters, epoxy, polyester and urethane acrylates.

3. Method according to claim 1, wherein the base polymer is mixed with coloring pigments, light stabilizers, heat stabilizers or processing aids.

4. Method according to claim 1, wherein the base polymer contains the radiation-sensitive additive at a concentration of from 0.001% by weight to 3% by weight.

5. Method according to claim 1, wherein the radiation-sensitive additive is a colored pigment or a metal salt.

6. Method according to claim 1, wherein the laser-sensitive coating is applied between two glass sheets and hardened.

7. Method according to claim 2 wherein said base polymer is an aliphatic polyurethane acrylate.

8. Method according to claim 5, wherein said radiation-sensitive additive is copper hydroxide phosphate or Iriodin® pearl lustre pigment.

9. Process for the production of an inscribable multilayer glass, comprising the steps of, in order:
   a) bonding two glass sheets to one another in such a way that a cavity remains between them,
   b) filling the cavity present between the glass sheets with a coating material to such an extent that only a small partial region remains,
   c) introducing into the partial region a laser-sensitive coating material comprising
      i) a base polymer and
      ii) a radiation-sensitive additive which exhibits a color change upon laser irradiation,
   d) carrying out a radiation-chemical hardening of the coating, and
   e) inscribing the multilayer glass by means of a laser.

* * * * *